(12) United States Patent
Madadi et al.

(10) Patent No.: US 12,389,256 B2
(45) Date of Patent: Aug. 12, 2025

(54) METHOD FOR UTILIZING CHANNEL SPARSITY AND COHERENCE IN CSI FEEDBACK

(71) Applicant: Samsung Electronics Co., Ltd., Suwon-si (KR)

(72) Inventors: Pranav Madadi, Sunnyvale, CA (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/807,353

(22) Filed: Jun. 16, 2022

(65) Prior Publication Data
US 2022/0417779 A1 Dec. 29, 2022

Related U.S. Application Data

(60) Provisional application No. 63/215,236, filed on Jun. 25, 2021.

(51) Int. Cl.
*H04W 24/10* (2009.01)
(52) U.S. Cl.
CPC .................................. *H04W 24/10* (2013.01)
(58) Field of Classification Search
None
See application file for complete search history.

(56) References Cited

U.S. PATENT DOCUMENTS

| 2019/0280753 | A1  | 9/2019 | Maamari et al. |
| 2020/0007213 | A1* | 1/2020 | Kakishima ............ H04L 5/0057 |
| 2022/0159417 | A1* | 5/2022 | Zhou ..................... H04W 72/23 |

(Continued)

FOREIGN PATENT DOCUMENTS

KR   10-2020-0005542 A   1/2020

OTHER PUBLICATIONS

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

(Continued)

*Primary Examiner* — Derrick W Ferris
*Assistant Examiner* — Keith Follansbee (57) ABSTRACT

Sparsity assisted channel state information (CSI) reporting or two-step CSI reporting is enabled or disabled for a user equipment. The configuration enabling/disabling sparsity assisted truncation for CSI reporting or two-step CSI reporting includes a domain for transformation of CSI for the sparsity assisted CSI reporting, and a time window for correlated channel. When the configuration enables sparsity assisted truncation for CSI reporting, a fixed number of non-zero coefficients and one or more threshold values for delay/angle or doppler for truncation are configured. When sparsity assisted truncation for CSI reporting is enabled, received the CSI reference signals are measured based on the configuration and a CSI report is transmitted indicating a specific range for which truncation occurred. When two-step CSI reporting is enabled, CSI compression corresponding to the at least one configuration and the time window is performed and CSI feedback is transmitted along with a flag.

20 Claims, 6 Drawing Sheets

(56) References Cited

U.S. PATENT DOCUMENTS

2022/0286261 A1* 9/2022 Wu .................... H04L 5/0057
2023/0354327 A1* 11/2023 El Hamss ............ H04L 5/001

OTHER PUBLICATIONS

"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
Wen et al., "Channel Estimation for Massive MIMO using Gaussian-Mixture Bayesian Learning," IEEE Trans. Wireless Commun., vol. 14, No. 3, Mar. 2015, 13 pages.
Zhou et al., "Experimental Study of MIMO Channel Statistics and Capacity via Virtual Channel Representation," Univ. Wisconsin-Madison, Madison, WI, Tech. Rep 5, 2007, 19 pages.
International Search Report and Written Opinion issued Sep. 28, 2022 regarding International Application No. PCT/KR2022/008862, 6 pages.
Zte, "CSI enhancements for Multi-TRP and FR1 FDD reciprocity", 3GPP TSG RAN WG1 #104b-e, R1-2102666, Apr. 2021, 15 pages.
Interdigital, Inc., "Further Discussion on CSI Enhancements for NCJT MTRP", 3GPP TSG RAN WG1 #104b-e, R1-2102438, Apr. 2021, 5 pages.
Oppo, "CSI enhancements: MTRP and FR1 FDD reciprocity ", 3GPP TSG RAN WG1 #103e e-Meeting, R1- 2008223, Oct. 2020, 1 pages.
Extended European Search Report issued Jul. 12, 2024 regarding Application No. 22828744.7, 7 pages.
Wang et al., "Channel Estimation and Hybrid Precoding for Multi-Panel Millimeter Wave MIMO", 2018 IEEE International Conference on Communications (ICC), May 2018, 6 pages.
Huawei et al., "DL RS Design for NR Beam Management", 3GPP TSG RAN WG1 Meeting #87, R1-1611242, Nov. 2016, 5 pages.
Kyocera, "CSI Measurement and Feedback for Elevation BF/FD-MIMO", 3GPP TSG RAN WG1 Meeting #82, R1-154012, Aug. 2015, 2 pages.
Mahdavi et al., "A Low Complexity Massive MIMO Detection Scheme Using Angular-Domain Processing", 2018 IEEE Global Conference on Signal and Information Processing (GlobalSIP), Nov. 2018, pp. 181-185.

* cited by examiner

METHOD FOR UTILIZING CHANNEL SPARSITY AND COHERENCE IN CSI FEEDBACK

CROSS-REFERENCE TO RELATED APPLICATION AND CLAIM OF PRIORITY

This application claims priority to U.S. Provisional Patent Application No. 63/215,236 filed Jun. 25, 2021. The content of the above-identified patent document(s) is incorporated herein by reference.

TECHNICAL FIELD

The present disclosure relates generally to channel state information in communication systems, and more specifically to improved reporting of channel state information.

BACKGROUND

To meet the demand for wireless data traffic having increased since deployment of 4th Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Sparsity assisted channel state information (CSI) reporting or two-step CSI reporting is enabled or disabled for a user equipment. The configuration enabling/disabling sparsity assisted truncation for CSI reporting or two-step CSI reporting includes a domain for transformation of CSI for the sparsity assisted CSI reporting, and a time window for correlated channel. When the configuration enables sparsity assisted truncation for CSI reporting, a fixed number of non-zero coefficients and one or more threshold values for delay/angle or doppler for truncation are configured. When sparsity assisted truncation for CSI reporting is enabled, received the CSI reference signals are measured based on the configuration and a CSI report is transmitted indicating a specific range for which truncation occurred. When two-step CSI reporting is enabled, CSI compression corresponding to the at least one configuration and the time window is performed and CSI feedback is transmitted along with a flag.

In one embodiment, a method includes receiving configuration information for one of sparsity assisted channel state information (CSI) reporting or two-step CSI reporting. The configuration information includes enabling/disabling of the one of sparsity assisted truncation for CSI reporting or two-step CSI reporting, a domain for transformation of CSI for the sparsity assisted CSI reporting, when the configuration information is for sparsity assisted CSI reporting, and a time window for correlated channel, when the configuration information is for two-step CSI reporting. When the configuration information is for sparsity assisted CSI reporting and sparsity assisted truncation for CSI reporting is enabled, the configuration information further includes: a fixed number of non-zero coefficients, and one or more threshold values for delay/angle or doppler for truncation. The method also includes receiving CSI reference signals corresponding to at least one configuration associated with the configuration information. When the configuration information is for sparsity assisted CSI reporting and sparsity assisted truncation for CSI reporting is enabled, the method includes: measuring the CSI reference signals based on the configuration information; and transmitting a CSI report, wherein, when sparsity assisted truncation for CSI reporting is enabled, the CSI report indicates a specific range for which truncation occurred. When the configuration information is for two-step CSI reporting and two-step CSI reporting is enabled, the method includes: performing CSI compression corresponding to the at least one configuration and the time window; and transmitting CSI feedback along with a flag.

In a second embodiment, a user equipment (UE) includes a processor and a transceiver. The transceiver is configured to receive configuration information for one of sparsity assisted channel state information (CSI) reporting or two-step CSI reporting. The configuration information includes enabling/disabling the one of sparsity assisted truncation for CSI reporting or two-step CSI reporting, a domain for transformation of CSI for the sparsity assisted CSI reporting, when the configuration information is for sparsity assisted CSI reporting, and a time window for correlated channel, when the configuration information is for two-step CSI reporting. When the configuration information is for sparsity assisted CSI reporting and sparsity assisted truncation for CSI reporting is enabled, the configuration information further includes: a fixed number of non-zero coefficients; and one or more threshold values for delay/angle or doppler for truncation. When the configuration information is for sparsity assisted CSI reporting and sparsity assisted truncation for CSI reporting is enabled, the transceiver is configured to receive CSI reference signals corresponding to at least one configuration associated with the configuration information, the processor is configured to measure the CSI reference signals based on the configuration information, and the transceiver is configured to transmit a CSI report, wherein, when sparsity assisted truncation for CSI reporting is enabled, the CSI report indicates a specific range for which truncation occurred. When the configuration information is for two-step CSI reporting and two-step CSI reporting is enabled, the processor is configured to perform CSI compression corresponding to the at least one configuration and the time window, and the transceiver is configured to transmit CSI feedback along with a flag.

In either of the foregoing embodiments, when the configuration information is for sparsity assisted CSI reporting and sparsity assisted truncation for CSI reporting is enabled, the configuration information further includes a specific range for truncation.

In either of the foregoing embodiments, when the configuration information is for sparsity assisted CSI reporting and sparsity assisted truncation for CSI reporting is enabled, the configuration information further includes an indication of threshold values for one of delay/angle or doppler for truncation.

In either of the foregoing embodiments, the domain for transformation of CSI for the sparsity assisted CSI reporting includes at least one of angular-delay domain or delay-doppler domain.

In either of the foregoing embodiments, when the configuration information is for sparsity assisted CSI reporting and sparsity assisted truncation for CSI reporting is enabled, the CSI report indicates specific values that were truncated based on threshold values configured by the configuration information.

In either of the foregoing embodiments, when the configuration information is for two-step CSI reporting, the flag indicates one of full master CSI feedback information or supporting CSI feedback information.

In either of the foregoing embodiments, when the configuration information is for two-step CSI reporting, the full master CSI feedback information is one of high resolution or artificial intelligence (AI) based with a first number of feedback bits, and the supporting CSI feedback information is one of low resolution or AI based with a second number of feedback bits.

In either of the foregoing embodiments, when the configuration information is for two-step CSI reporting, the UE transmits supporting information selected from a velocity of the UE for use by the base station in determining the time window for the two-step CSI feedback or a suggestive correlation time window value.

In another embodiment, a base station (BS) includes a processor and a transceiver. The is configured to transmit configuration information for one of sparsity assisted channel state information (CSI) reporting or two-step CSI reporting. The configuration information includes enabling/disabling of the one of sparsity assisted truncation for CSI reporting or two-step CSI reporting, a domain for transformation of CSI for the sparsity assisted CSI reporting, when the configuration information is for sparsity assisted CSI reporting, and a time window for correlated channel, when the configuration information is for two-step CSI reporting. When the configuration information is for sparsity assisted CSI reporting and sparsity assisted truncation for CSI reporting is enabled, the configuration information further includes: a fixed number of non-zero coefficients; and one or more threshold values for delay/angle or doppler for truncation. The transceiver is configured to transmit CSI reference signals corresponding to at least one configuration associated with the configuration information, and receive a CSI report. When sparsity assisted truncation for CSI reporting is enabled, the CSI report indicates a specific range for which truncation occurred, when the configuration information is for sparsity assisted CSI reporting and sparsity assisted truncation for CSI reporting is enabled. When the configuration information is for two-step CSI reporting and two-step CSI reporting is enabled, the received CSI feedback is associated with a flag and is compressed based on the at least one configuration and the time window. The processor is configured to determine CSI from the received CSI report.

In the foregoing other embodiment, when the configuration information is for sparsity assisted CSI reporting and sparsity assisted truncation for CSI reporting is enabled, the configuration information further includes one of a specific range for truncation or an indication of threshold values for one of delay/angle or doppler for truncation, the domain for transformation of CSI for the sparsity assisted CSI reporting includes at least one of angular-delay domain or delay-doppler domain, and the CSI report indicates specific values that were truncated based on threshold values configured by the configuration information.

In the foregoing other embodiment, when the configuration information is for two-step CSI reporting and two-step CSI reporting is enabled, the flag indicates one of full master CSI feedback information or supporting CSI feedback information, and the processor is configured to retain full master CSI feedback information for the duration of the time window and reconstruct CSI using the retained full master CSI information and supporting CSI feedback information.

In the foregoing other embodiment, when the configuration information is for two-step CSI reporting and two-step CSI reporting is enabled, when a new full master CSI information is not received after the configured time window, the processor is configured to initiate an aperiodic triggering of a full master CSI feedback from the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP TS 38.331 Rel-16 v16.3.1, "NR; Radio Resource Control (RRC) protocol specification," January 2021.
[2] 3GPP TS 38.214 Rel-16 v16.4.0, "NR; Physical layer procedures for data," January 2021.
[3] 3GPP TS 38.321 Rel-16 v16.3.0, "NR; Medium Access Control (MAC) protocol specification," January 2021.
[4] C. K. Wen, S. Jin, K. K. Wong, J. C. Chen, and P. Ting, "Channel estimation for massive MIMO using gaussian-mixture Bayesian learning," IEEE Trans. Wireless Commun., vol. 14, no. 3, pp. 1356-1368, March 2015
[5] Zhou, Yan, et al. "Experimental study of MIMO channel statistics and capacity via the virtual channel representation." Univ. Wisconsin-Madison, Madison, WI, USA, Tech. Rep 5 (2007): 10-15.

The above-identified references are incorporated herein by reference.

Abbreviations:
3GPP Third Generation Partnership Project
ML Machine Learning
AI Artificial Intelligence
gNB Base Station
UE User Equipment
NR New Radio
FDD Frequency Division Duplex
TDD Time Division Duplex
CSI Channel State Information
RI Rank Indicator
CQI Channel Quality Indicator
PMI Precoding Matrix Indicator
LI Layer Indicator
CRI CSI-RS Resource Indicator
AI-CFI Artificial Intelligent-Channel Feature Information
SCell Secondary Cell
SpCell Special Cell
PCell Primary Cell
RAT Radio Access Technology
RRC Radio Resource Control
DCI Downlink Control Information
MAC-CE Medium Access Control—Control Element
DL Downlink
UL Uplink
LTE Long-Term Evolution In MU-MIMO FDD systems, acquiring accurate CSI information at the BS is important for system performance, but the overhead required for the level of feedback associated with CSI is usually very high. In this disclosure, this problem of high CSI feedback overhead and propose solutions that leverage certain specific features of the channel to reduce the overhead.

In current 3GPP standards, CSI feedback is reported at a given time instant, i.e., snapshot based and considers channel in spatial-frequency domain. This disclosure proposes using channel in another domain, i.e., angular-delay domain, to leverage the sparsity in that domain to reduce the feedback overhead. Given the channel is correlated in time, using a feedback framework that leverages the correlation in time to reduce the feedback.

Figure 1:
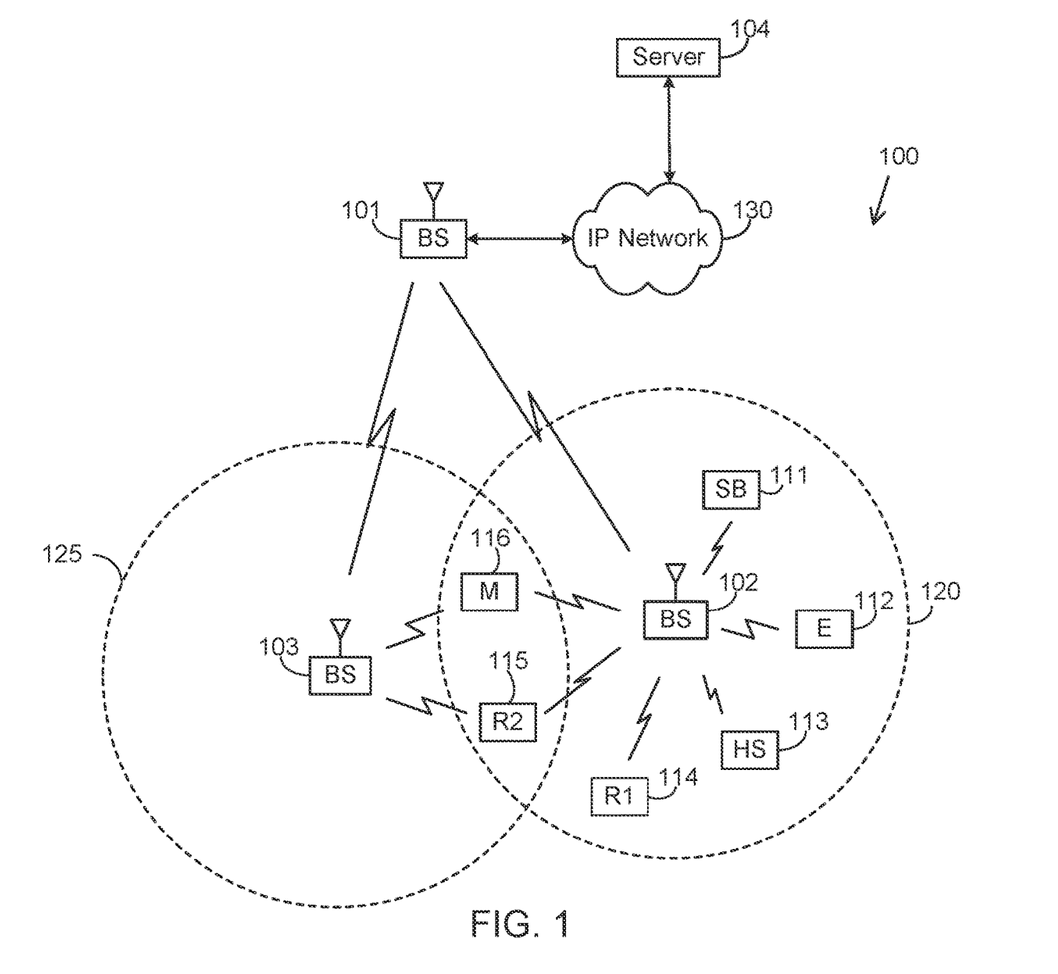
FIG. 1 illustrates an exemplary networked system utilizing channel sparsity and coherence in CSI feedback according to various embodiments of this disclosure.

FIG. 1 illustrates an exemplary networked system utilizing channel sparsity and coherence in CSI feedback according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the term "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
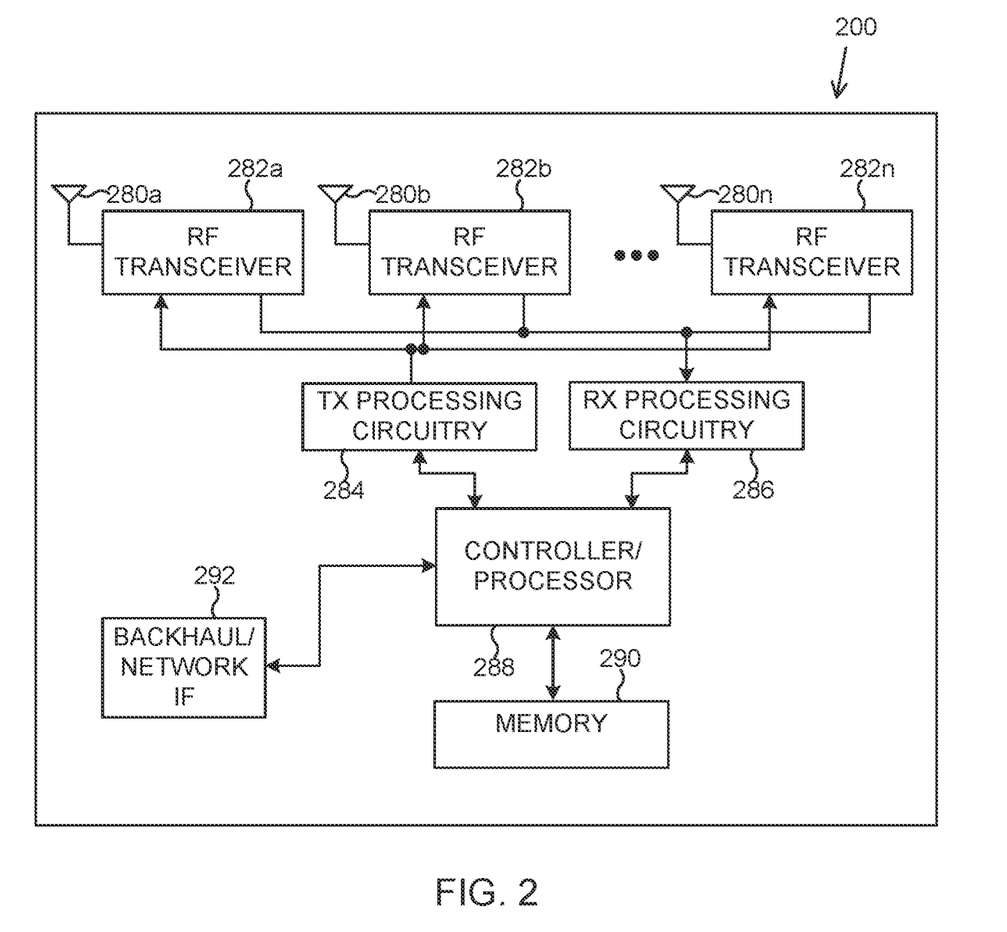
FIG. 2 illustrates an exemplary base station (BS) utilizing channel sparsity and coherence in CSI feedback according to various embodiments of this disclosure.

FIG. 2 illustrates an exemplary base station (BS) utilizing channel sparsity and coherence in CSI feedback according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280a-280n, multiple radio frequency (RF) transceivers 282a-282n, transmit (TX or Tx) processing circuitry 284, and receive (RX or Rx) processing circuitry 286. The BS 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
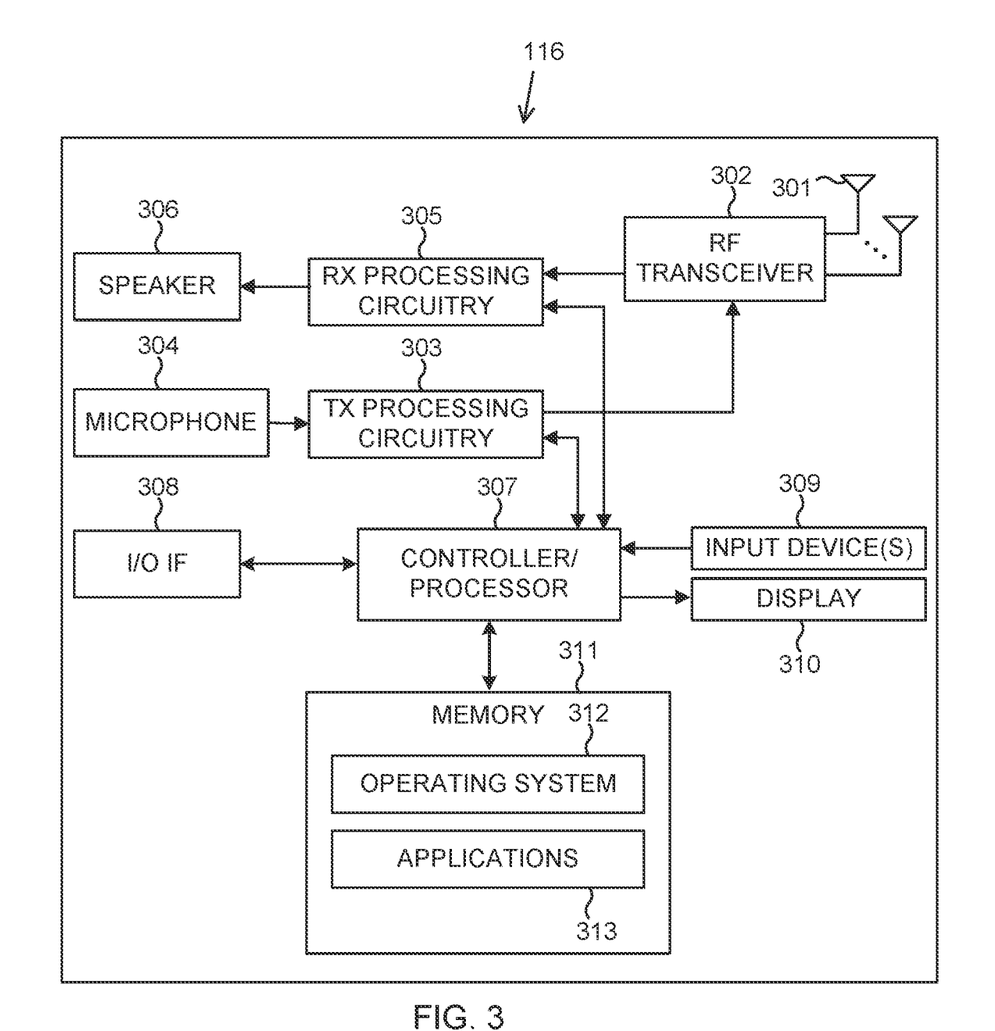
FIG. 3 illustrates an exemplary electronic device for communicating in the networked computing system utilizing channel sparsity and coherence in CSI feedback according to various embodiments of this disclosure.

FIG. 3 illustrates an exemplary electronic device for communicating in the networked computing system utilizing channel sparsity and coherence in CSI feedback according to various embodiments of this disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The embodiments of the disclosure are applicable in general to any communication system for reduction of overhead associated with CSI feedback.

In an embodiment of sparsity-based CSI feedback, the BS configures the UE to transform the estimated channel to different domains such as angular-delay domain or delay-Doppler domain and leverages the sparsity of the channel. The main idea is that the channel is known to be sparse in angular-delay/delay-Doppler domains and this sparsity can be exploited to reduce CSI feedback overhead. CSI estimated at the UE based on CSI-RS can be transformed directly into these domains based on the antenna configurations. For example, for a uniform linear array (ULA) transmit antenna configuration at BS, simple discrete Fourier transform (DFT) matrices can be used to transform the estimated spatial-frequency CSI at UE into angular-delay domain. More details are explained below.

Figure 4:
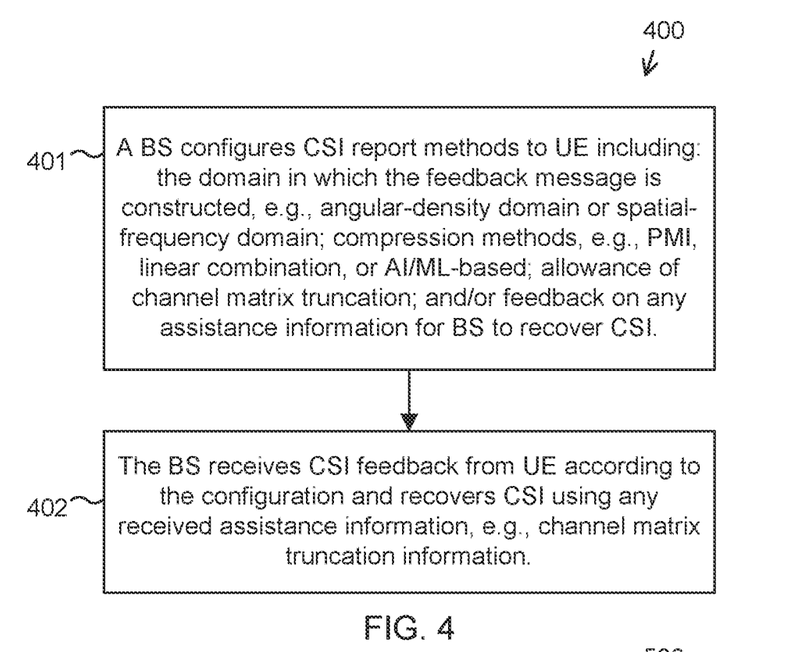
FIG. 4 illustrates a flowchart for an example of BS operation to support angular-delay based CSI feedback according to embodiments of the present disclosure.

FIG. 4 illustrates a flowchart for an example of BS operation to support angular-delay based CSI feedback according to embodiments of the present disclosure. FIG. 4 is an example of a method 400 for operations at BS side to support CSI feedback by leveraging the sparsity of channel in angular-delay domain.

At operation 401, the BS sends CSI reporting related configuration to the UE using RRC messages, such as the CSI reporting parameters (PMI, RI, CQI, L1, CRI), CSI configuration type (periodic, semi-persistent PUCCH, semi-persistent PUSCH, aperiodic), report frequency configuration (frequency granularity, i.e., wideband/subband), codebook configuration (Type-1/Type2 codebook parameters, PMI-based, or AI/ML-based feedback), domains for transformation (frequency-space or angular-delay), and the allowance of channel matrix truncation in the case when channel matrix sparsity is utilized in constructing CSI report, i.e., BS enables/disables the sparsity assisted CSI reporting along with indication of the transformed domain for transformation.

The BS configures the UE with parameters related to various pruning, truncation or AI based schemes used to leverage sparsity for reduction in CSI feedback. In one embodiment, for angular-delay domain based CSI feedback the UE can truncate the estimated channel, if the allowance is indicated by the BS, in angular delay domain for a range of delay values and the BS with the help of configuration parameters can control the process of truncation. An example of the angular-delay transformed channel along with the transformation process is explained in detail in the "Angular Delay Transformation" section below. In one example, the maximum allowed range for truncation can be set by introducing a new information element (IE) MaxDelayTrcRange within the CSI reporting configuration. In another embodiment the UE may be configured to select a certain number of non-zero parameters among the transformed channel to reduce the CSI feedback overhead and the BS can control this selection process with help of configuration parameters. In one example, the maximum number of non-zero parameters can be set by introducing a new IE MaxNZP within the CSI reporting configuration. The BS can also configure criteria for channel truncation. For instance, if channel amplitude at a delay tap is smaller than N decibels (dB) from the maximum amplitude value at a certain delay tap, then those delay taps can be truncated in constructing feedback message.

At operation 402, the BS receives CSI feedback from the UE according to its set configuration. In the process of reconstructing the accurate CSI, the BS may require knowledge of the operation that occurred at the UE for reducing the feedback, either the process of truncation or selection of non-zero parameters. Accordingly, the UE can send additional information along with the CSI feedback. In one embodiment, the UE sends the indices of delay values for which the truncation has occurred and in yet another embodiment, the UE sends the delay tones among which the UE selected the non-zero parameters.

Figure 5:
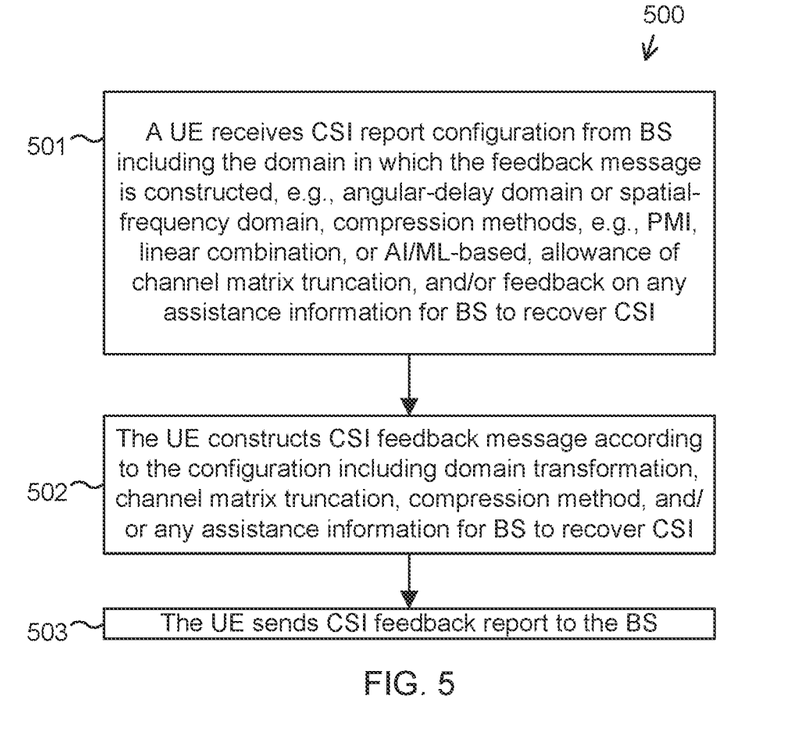
FIG. 5 illustrates a flowchart for an example of UE operation to support angular-delay based CSI feedback according to embodiments of the present disclosure.

FIG. 5 illustrates a flowchart for an example of UE operation to support angular-delay based CSI feedback according to embodiments of the present disclosure. FIG. 5 is an example of a method 500 for operations at UE to construct CSI report according to the configuration by BS according to method 400. As an example, the UE can construct CSI report in angular-delay domain and to leverage sparsity of channel via truncation, if indicated by BS.

At operation 501, the UE receives the CSI reporting related configuration from the BS through RRC messages, such as the CSI reporting parameters (PMI, RI, CQI, L1, CRI), CSI configuration type (periodic, semi-persistent PUCCH, semi-persistent PUSCH, aperiodic), report frequency configuration (frequency granularity, i.e., wideband/subband), codebook configuration (Type-1/Type2 codebook parameters, PMI-based, or AI/ML-based feedback), domains for transformation (frequency-space or angular-delay), and the allowance of channel matrix truncation in the case when channel matrix sparsity is utilized in constructing CSI report.

In one embodiment, for angular-delay domain based CSI feedback the UE can truncate the estimated channel in angular delay domain for a range of delay values and the BS with the help of configuration parameters can control the process of truncation. In one example, the maximum allowed range for truncation can be set by introducing a new IE MaxDelayTrcRange within the CSI reporting configuration. In another embodiment the UE can select a certain number of non-zero parameters among the transformed channel to reduce the CSI feedback overhead and the BS can control this selection process with help of configuration parameters. In one example, the maximum number of non-zero parameters can be set by introducing a new IE MaxNZP within the CSI reporting configuration. In one embodiment, the UE can truncate the channel matrix according to the configured criteria for channel truncation. For instance, if channel amplitude at a delay tap is smaller than N dB from the maximum amplitude value at a certain delay tap, then those delay taps can be truncated in constructing feedback message.

At operation 502, the UE transforms the predicted CSI into angular-delay domain, if configured by the BS. An example of the angular-delay transformed channel along with the transformation process is explained in detail below. In one embodiment, the UE truncates the transformed channel based on the observed sparsity and the guidelines set by the BS, and in another embodiment UE chooses a certain number of significant non-zero parameters as deemed necessary.

At operation 503, the UE sends CSI feedback to the BS according to the set configuration. In the process of reconstructing the accurate CSI, the BS may require knowledge of the operation that occurred at the UE for reducing the feedback, either the process of truncation or selection of non-zero parameters. Accordingly, the UE may send additional information along with the CSI feedback. In one embodiment, the UE sends the indices of delay values for which the truncation may occur and in yet another embodiment, the UE sends the delay tones among which the UE selected the non-zero parameters.

In the embodiment, the BS configures the UE with a two-step CSI feedback approach, to reduce the overall feedback overhead. The two-step reporting approach can leverage the correlation of the channel in time and allow to have feedback with high overhead labelled as a master copy for each coherence time that can contain a majority of the structural information related to the channel, and for every other reporting of channel within the coherence time using less feedback that just captures the correlation information. In one example, if a UE sends CSI report first time during a certain time window, the initial feedback message contains full feedback information and the subsequent feedback within the time window from recent feedback can be supplemental feedback information based on the past feedback information. The time window values can be defined by specification, or indicated by RRC, MAC-CE, or DCI. In another embodiment, there may be no set time window value by the BS and the determination of sending either master or supporting CSI report can be up to UE's decision, which can be based on the estimation of channel coherence time at the UE utilizing, e.g., the UE's mobility.

Figure 6:
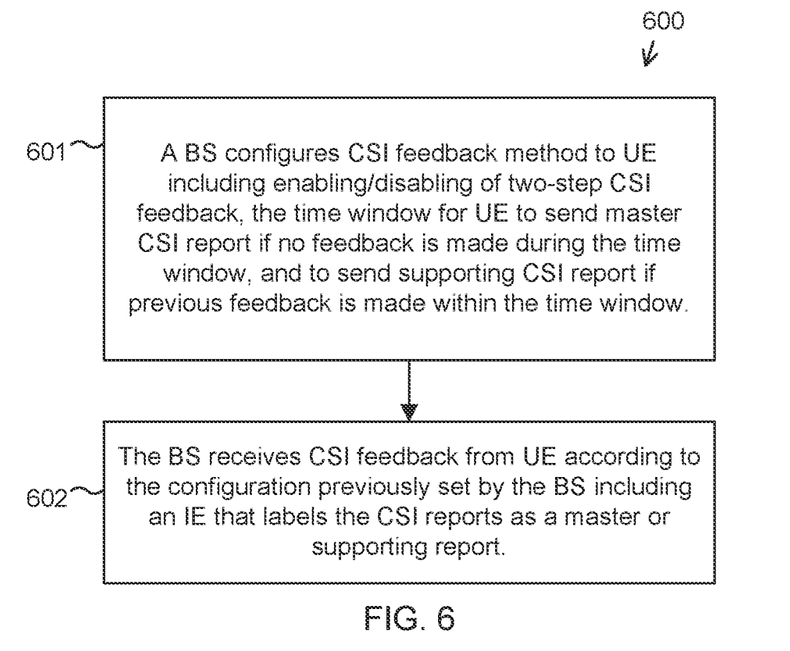
FIG. 6 illustrates a flowchart for an example of BS operation to support two-step CSI feedback according to embodiments of the present disclosure.

FIG. 6 illustrates a flowchart for an example of BS operation to support two-step CSI feedback according to embodiments of the present disclosure. FIG. 6 is an example of a method 600 for operations at BS side to support two-step CSI feedback by leveraging time correlation of channel.

At operation 601, the BS sends a CSI reporting related configuration to the UE, e.g., using RRC messages, such as the CSI reporting parameters (PMI, RI, CQI, L1, CRI), CSI configuration type (periodic, semi-persistent PUCCH, semi-persistent PUSCH, aperiodic), report frequency configuration (frequency granularity, i.e., wideband/subband), codebook configuration (Type-1/Type2 codebook parameters, AI/ML-based or PMI-based), enabling/disabling of two-step CSI feedback. The enabling/disabling of two-step CSI feedback can also be sent via DCI or MAC-CE. The BS may also configure a UE on the time window during which if no feedback is made. Then, the UE may send full master CSI feedback information. Otherwise, the UE can send supporting CSI feedback information.

In one embodiment, the master CSI feedback (report) can be the high-resolution feedback (Rel16 Type-2) that specifies dominant beam direction per subband while the supporting CSI feedback (reports) can be the motion vector, i.e., the change to be added to the dominant beams. In another embodiment, the master CSI feedback can be AI based with more feedback bits that captures structural information and supporting CSI feedback can utilize less feedback bits that only captures the correlation information, i.e., the supporting CSI feedback needs to be concatenated with master CSI report to reconstruct the CSI. Yet in another embodiment, the master CSI feedback can be high-resolution (Rel-16 Type-2) and the supporting CSI feedback can be low-resolution (Rel150 Type-1) feedback.

At operation 602, the BS receives CSI feedback from the UE according to the configuration set by the BS. The CSI reports received from the UE are labelled using an information element (IE) as master or supporting report. The BS, possibly aware of the fact that a CSI report is a two-step CSI feedback, looks for the label of the CSI report and temporarily stores the CSI report labelled as master report.

At operation 603, the BS may use the received master and supporting feedback report and reconstruct an accurate CSI in order to generate the precoder matrix to be used to DL data transmission. At the instant BS receives the master CSI report, the BS can use the master CSI report to reconstruct an accurate CSI. Every other supporting CSI report received after the master report may be concatenated with the stored master CSI feedback in order to reconstruct the accurate CSI. The supporting CSI feedback reports can capture the correlation information using less overhead and can be concatenated with the master CSI feedback which has the structural information of the channel and be used to reconstruct the channel. This dependency is possible because of the correlation of channel in time. Whenever a new master CSI report is received the BS replaces the previously stored CSI report with the latest one.

The reconstruction of an accurate CSI at each time instant may depend on having the master CSI report. Thus, in one embodiment, the BS can configure the UE to additionally report its coherence time, that helps the BS to keep track of the arrival of next master CSI report. In one embodiment, the BS can utilize the reported UE coherence time or any similar measure, such as reported or estimated UE speed, in configuring the time window in operation 601.

In the case of missed or lost CSI feedback of the master report, in one example the BS can generate the BS's own master report using previous master report and latest supporting report and in another example, can have an acknowledgement mechanism in place to let the UE know so that the BS can receive another master CSI report. In one embodiment, the BS can indicate the UE to send master CSI report through DCI, MAC-CE, or any signaling mechanism. When, UE receives this indication, the UE sends master CSI report regardless of whether the UE sent the UE' s latest feedback within the configured time window. This is because the feedback message can be lost and the BS and UE can have different understanding on the latest feedback.

Figure 7:
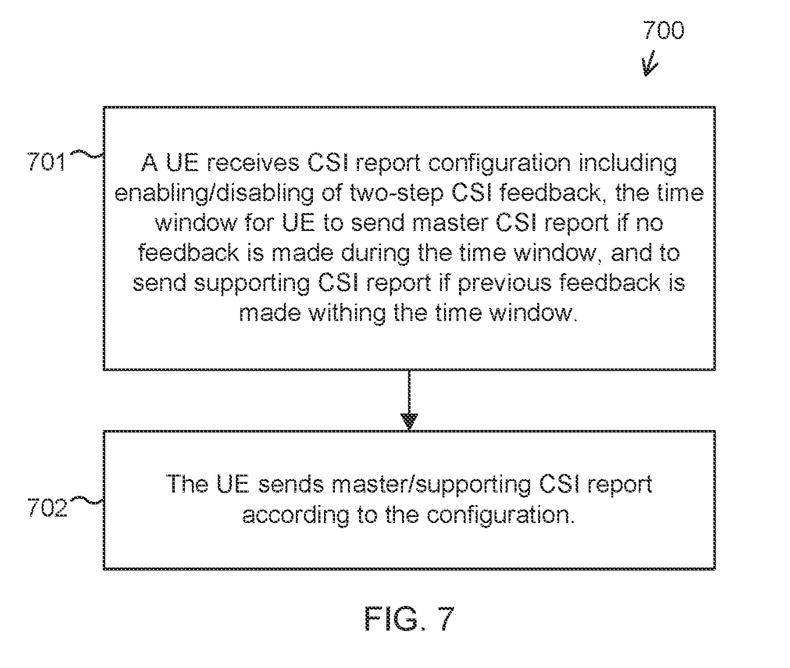
FIG. 7 illustrates a flowchart for an example of UE operation to support two-step CSI feedback according to embodiments of the present disclosure.

FIG. 7 illustrates a flowchart for an example of UE operation to support two-step CSI feedback according to embodiments of the present disclosure. FIG. 7 is an example of a method 700 for operations at UE side to support two-layer CSI feedback by leveraging the time correlation.

At operation 701, the UE receives the CSI reporting related configuration from the BS through RRC messages, such as the CSI reporting parameters (PMI, RI, CQI, L1, CRI), CSI configuration type (periodic, semi-persistent PUCCH, semi-persistent PUSCH, aperiodic), report frequency configuration (frequency granularity, i.e., wideband/subband), codebook configuration (Type-1/Type2 codebook parameters, PMI-based, and AI/ML-based), enabling/disabling of two-layer CSI feedback, and time window for sending master CSI feedback if no feedback is made during the time window. In another embodiment, although the time window may be configured by the BS, the UE can send master CSI feedback even if the previous feedback is made within the configured time window. This can take into account varying UE mobility and consequently the coherence time as well. If the UE detects that the channel is changing faster than the configured time window, the UE can send the master CSI report with the indication on the type of CSI report whether it is master or supporting CSI report. The UE can also feedback the coherence time or any similar measure, e.g., UE speed, to BS to assist the BS to properly set the time window. The BS can also request the UE to send feedback on the coherence time or any similar measure. In another embodiment, there may be no set time window by BS and the determination of sending master/supporting CSI can be up to UE's decision. The BS can directly indicate the UE to send master or supporting CSI feedback. If UE receives such indication, the UE follows the request.

At operation 702, the UE calculates the coherence time based on the local information such as the speed, which is then used to set a clock. In one example, the coherence time can be calculated at pre-determined periodic intervals, and in another example the coherence time can be calculated when triggered by an external trigger such as sudden change in speed, request from BS, etc.

For periodic and semi-persistent CSI reporting, the BS may set the CSI reporting periodicity as a part of higher layer CSI reporting configuration. If the UE is configured with a CSI reporting periodicity such that multiple CSI feedback reports should be sent within the calculated coherence time, the two-layer CSI reporting is activated. If not, even though the BS enabled two-layer CSI feedback in higher layer RRC configuration, the two-layer CSI reporting is not used by the UE.

At operation 703, if the two-layer CSI reporting is activated, the UE labels the first CSI feedback report as the master report and starts the clock with the calculated coherence time or according to the time window value set by BS, every other CSI report to be sent within the coherence time/time window, i.e., before the clock runs out is then labelled as supporting CSI report. Once the clock runs out, the UE may send a new master CSI report and resets the clock with the coherence time and the time window set by BS available at that instant.

In one embodiment, the UE may employ deterministic statistical methods to calculate the master and supporting CSI reports that have different feedback overhead. In another embodiment, an AI model can be used. The related parameters and the mechanism to be used can be set by BS using higher level RRC configuration, possibly based on the BS's knowledge of the algorithm used by UE so that it can successfully reconstruct the CSI at its end.

Transformation of the channel into angular delay domain is now described. For example, let us consider FDD massive MIMO system with $N_c$ subcarriers and $N_t$ transmit antennas deployed as uniform linear array (ULA). If we assume that number of receive antennas $N_r$ is one, the CSI channel may be denoted in spatial-frequency domain at a given time t, as $H_t \in \mathbb{C}^{(N_c \times N_t)}$.

Now, this matrix $H_t$ can be transformed into angular-delay domain $H'_t$, via 2-D discrete Fourier transform (2D-DFT) by $$H'_t = F_d H_t F_a$$

where, $F_d \in \mathbb{C}^{(N_c \times N_c)}$ and $F_a \in \mathbb{C}^{(N_t \times N_t)}$ are two DFT matrices.

Due to limited multipath time delay, performing DFT on frequency domain channel vectors can transform channel into sparse matrix in delay domain. Secondly, as proved in [4], the channel matrix is sparse in a defined angle domain by performing DFT on spatial domain channel vectors (i.e., row vectors of $H_t$) if the number of transmit antennas, $N_t \rightarrow \infty$, is very large.

In the case, where number of receive antennas $N_r > 1$, one can transform the spatial channel matrix at a given subcarrier (f), $H_t(f) \in \mathbb{C}^{(N_r \times N_t)}$, into to angular domain using 2D-DFT matrices as $$H'_t(f) = A_r^H H_t(f) A_t$$

where, $A_r \in \mathbb{C}^{(N_r \times N_r)}$ and $A_t \in \mathbb{C}^{(N_t \times N_t)}$ are unitary discrete Fourier transform matrices that transform the channel from spatial domain into angular domain [5].

Figure 8:
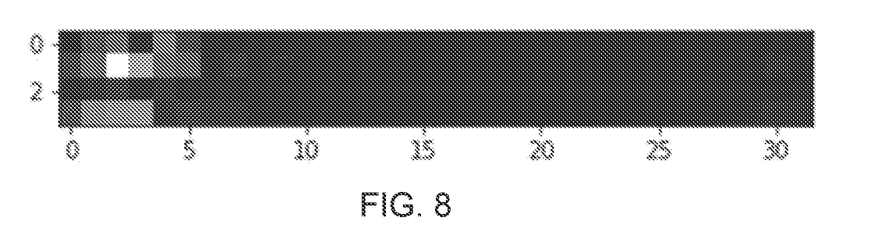
FIG. 8 illustrates the angular domain transformation of the CSI channel at a frequency, exhibiting angular spread limited to a range of angular spread values.
Figure 9:
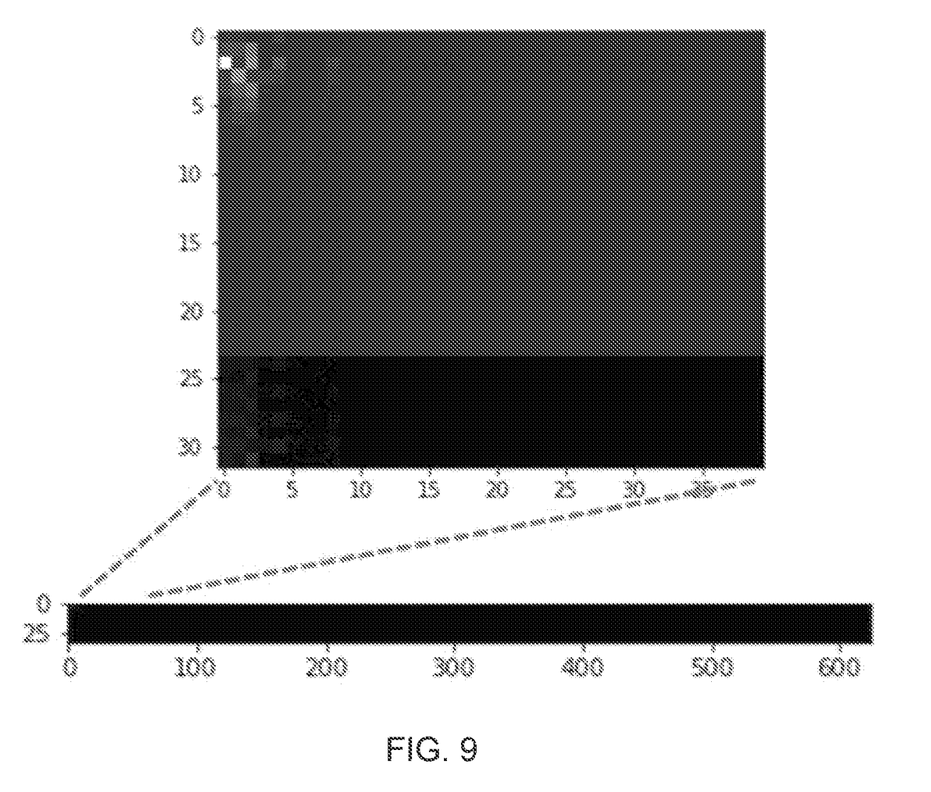
FIG. 9 illustrates the channel in angular-delay domain for a fixed number of subcarriers, where the channel is very sparse and has significant values only for delay taps less than a threshold.

FIG. 8 illustrates the angular domain transformation of the CSI channel at a frequency, exhibiting angular spread limited to a range of angular spread values. FIG. 8 illustrates the angular domain transformation of $H_t(f) \in \mathbb{C}^{4 \times 32}$. For each Rx-Tx pair, we then transform the frequency domain vector into time domain to transform the channel into delay domain. FIG. 9 illustrates the channel in angular-delay domain for $N_c = 624$, where the channel is very sparse and has significant values only for delay taps less than 40. FIG. 9 illustrates the channel in angular-delay domain for $(N_r, N_t, N_c) = (4, 32, 624)$ at a given receive antenna showing sparsity with significant values limited to lower delay taps.

For multi-user MIMO, the availability of accurate CSI is necessary in order to guarantee high multi-user performance. In frequency division duplex (FDD) systems, the CSI is acquired using the CSI reference signal (CSI-RS) transmission from a gNB, and CSI calculation and feedback from the mobile station or user equipment (UE). The significant overhead associated with the feedback is a bottleneck for performance.

This disclosure presents two solutions that leverage an acquired channel's inherent properties to reduce the overhead associated with the feedback. The solutions discussed significantly reduce the overhead and improves the system's performance.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method of operating a user equipment (UE), the method comprising:
receiving configuration information for one of sparsity assisted channel state information (CSI) reporting or two-step CSI reporting, the configuration information including
enabling/disabling of the one of sparsity assisted truncation for CSI reporting or two-step CSI reporting,
a domain for transformation of CSI for the sparsity assisted CSI reporting, when the configuration information is for sparsity assisted CSI reporting, and
a time window for correlated channel, when the configuration information is for two-step CSI reporting,
wherein, when the configuration information is for sparsity assisted CSI reporting and sparsity assisted truncation for CSI reporting is enabled, the configuration information further includes:
a fixed number of non-zero coefficients, and
one or more threshold values for delay/angle or doppler for truncation; and
receiving CSI reference signals corresponding to at least one configuration associated with the configuration information;
when the configuration information is for sparsity assisted CSI reporting and sparsity assisted truncation for CSI reporting is enabled,
measuring the CSI reference signals based on the configuration information; and
transmitting a CSI report, wherein, when sparsity assisted truncation for CSI reporting is enabled, the CSI report indicates a specific range for which truncation occurred;
when the configuration information is for two-step CSI reporting and two-step CSI reporting is enabled,
performing CSI compression corresponding to the at least one configuration and the time window, and
transmitting CSI feedback along with a flag,
wherein the flag indicates one of master CSI feedback information or supporting CSI feedback information.

2. The method of claim 1, wherein, when the configuration information is for sparsity assisted CSI reporting and sparsity assisted truncation for CSI reporting is enabled, the configuration information further includes a specific range for truncation.

3. The method of claim 1, wherein, when the configuration information is for sparsity assisted CSI reporting and sparsity assisted truncation for CSI reporting is enabled, the configuration information further includes an indication of threshold values for one of delay/angle or doppler for truncation.

4. The method of claim 1, wherein the domain for transformation of CSI for the sparsity assisted CSI reporting includes at least one of angular-delay domain or delay-doppler domain.

5. The method of claim 1, wherein, when the configuration information is for sparsity assisted CSI reporting and sparsity assisted truncation for CSI reporting is enabled, the CSI report indicates specific values that were truncated based on threshold values configured by the configuration information.

6. The method of claim 1, wherein the supporting CSI feedback information is concatenated with the master CSI feedback information to reconstruct a channel.

7. The method of claim 1, wherein, when the configuration information is for two-step CSI reporting, the master CSI feedback information is one of high resolution or artificial intelligence (AI) based with a first number of feedback bits, and the supporting CSI feedback information is one of low resolution or AI based with a second number of feedback bits.

8. The method of claim 1, wherein, when the configuration information is for two-step CSI reporting, the method further includes transmitting supporting information selected from a velocity of the UE for use by a base station in determining the time window for the two-step CSI reporting or a suggestive correlation time window value.

9. A user equipment (UE), comprising:
a processor; and
a transceiver configured to
receive configuration information for one of sparsity assisted channel state information (CSI) reporting or two-step CSI reporting, the configuration information including
enabling/disabling the one of sparsity assisted truncation for CSI reporting or two-step CSI reporting,
a domain for transformation of CSI for the sparsity assisted CSI reporting, when the configuration information is for sparsity assisted CSI reporting, and
a time window for correlated channel, when the configuration information is for two-step CSI reporting,
wherein, when the configuration information is for sparsity assisted CSI reporting and sparsity assisted truncation for CSI reporting is enabled, the configuration information further includes:
a fixed number of non-zero coefficients, and
one or more threshold values for delay/angle or doppler for truncation, and
wherein, when the configuration information is for sparsity assisted CSI reporting and sparsity assisted truncation for CSI reporting is enabled,
the transceiver is configured to receive CSI reference signals corresponding to at least one configuration associated with the configuration information,
the processor is configured to measure the CSI reference signals based on the configuration information, and
the transceiver is configured to transmit a CSI report, wherein, when sparsity assisted truncation for CSI reporting is enabled, the CSI report indicates a specific range for which truncation occurred, and
wherein, when the configuration information is for two-step CSI reporting and two-step CSI reporting is enabled,
the processor is configured to perform CSI compression corresponding to the at least one configuration and the time window, and
the transceiver is configured to transmit CSI feedback along with a flag,
wherein the flag indicates one of master CSI feedback information or supporting CSI feedback information.

10. The UE of claim 9, wherein, when the configuration information is for sparsity assisted CSI reporting and sparsity assisted truncation for CSI reporting is enabled, the configuration information further includes a specific range for truncation.

11. The UE of claim 9, wherein, when the configuration information is for sparsity assisted CSI reporting and sparsity assisted truncation for CSI reporting is enabled, the configuration information further includes an indication of threshold values for one of delay/angle or doppler for truncation.

12. The UE of claim 9, wherein the domain for transformation of CSI for the sparsity assisted CSI reporting includes at least one of angular-delay domain or delay-doppler domain.

13. The UE of claim 9, wherein, when the configuration information is for sparsity assisted CSI reporting and sparsity assisted truncation for CSI reporting is enabled, the CSI report indicates specific values that were truncated based on threshold values configured by the configuration information.

14. The UE of claim 9, wherein the supporting CSI feedback information is concatenated with the master CSI feedback information to reconstruct a channel.

15. The UE of claim 9, wherein, when the configuration information is for two-step CSI reporting, the master CSI feedback information is one of high resolution or artificial intelligence (AI) based with a first number of feedback bits, and the supporting CSI feedback information is one of low resolution or AI based with a second number of feedback bits.

16. The UE of claim 9, wherein, when the configuration information is for two-step CSI reporting, the transceiver is configured to transmit supporting information selected from a velocity of the UE for use by a base station in determining the time window for the two-step CSI reporting or a suggestive correlation time window value.

17. A base station (BS), comprising:
a transceiver configured to
transmit configuration information for one of sparsity assisted channel state information (CSI) reporting or two-step CSI reporting, the configuration information including
enabling/disabling of the one of sparsity assisted truncation for CSI reporting or two-step CSI reporting, and
a domain for transformation of CSI for the sparsity assisted CSI reporting, when the configuration information is for sparsity assisted CSI reporting, and
a time window for correlated channel, when the configuration information is for two-step CSI reporting,
wherein, when the configuration information is for sparsity assisted CSI reporting and sparsity assisted truncation for CSI reporting is enabled, the configuration information further includes:
a fixed number of non-zero coefficients, and
one or more threshold values for delay/angle or doppler for truncation, and transmit CSI reference signals corresponding to at least one configuration associated with the configuration information, and receive a CSI report, wherein, when sparsity assisted truncation for CSI reporting is enabled, the CSI report indicates a specific range for which truncation occurred, when the configuration information is for sparsity assisted CSI reporting and sparsity assisted truncation for CSI reporting is enabled, wherein, when the configuration information is for two-step CSI reporting and two-step CSI reporting is enabled, the received CSI report is associated with a flag and is compressed based on the configuration information and the time window; and a processor configured to determine CSI from the received CSI report, wherein the flag indicates one of master CSI feedback information or supporting CSI feedback information.

18. The base station of claim 17, wherein, when the configuration information is for sparsity assisted CSI reporting and sparsity assisted truncation for CSI reporting is enabled, the configuration information further includes one of a specific range for truncation or an indication of threshold values for one of delay/angle or doppler for truncation, the domain for transformation of CSI for the sparsity assisted CSI reporting includes at least one of angular-delay domain or delay-doppler domain, and the CSI report indicates specific values that were truncated based on threshold values configured by the configuration information.

19. The base station of claim 17, the supporting CSI feedback information is concatenated with the master CSI feedback information to reconstruct a channel, and the processor is configured to retain the master CSI feedback information for a duration of the time window and reconstruct CSI using the retained master CSI information and the supporting CSI feedback information.

20. The base station of claim 17, wherein, when the configuration information is for two-step CSI reporting and two-step CSI reporting is enabled, when a new master CSI information is not received after a configured time window, the processor is configured to initiate an aperiodic triggering of a master CSI feedback from a user equipment.

* * * * *